US009509143B1

(12) United States Patent
Buuck (10) Patent No.: US 9,509,143 B1
(45) Date of Patent: Nov. 29, 2016

(54) WIDE DYNAMIC RANGE CHARGER

(71) Applicant: Amazon Technologies, Inc., Seattle, WA (US)

(72) Inventor: David C. Buuck, Prunedale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/659,201

(22) Filed: Mar. 16, 2015

Related U.S. Application Data

(63) Continuation of application No. 13/169,767, filed on Jun. 27, 2011, now Pat. No. 8,981,707.

(51) Int. Cl.
*H02J 7/00* (2006.01)
*H02J 3/38* (2006.01)
*H02S 40/34* (2014.01)

(52) U.S. Cl.
CPC .............. *H02J 3/385* (2013.01); *H02S 40/34* (2014.12)

(58) Field of Classification Search
USPC ....................................................... 320/101
See application file for complete search history.

(56) References Cited

U.S. PATENT DOCUMENTS

| 7,681,090 B2 | 3/2010 | Kimball et al. | |
| 2009/0284998 A1* | 11/2009 | Zhang | G05F 1/67 363/55 |
| 2009/0303764 A1* | 12/2009 | Jin | H02J 3/1842 363/87 |
| 2010/0123428 A1* | 5/2010 | Wu | H02J 7/0008 320/102 |
| 2010/0132756 A1 | 6/2010 | Tonooka et al. | |
| 2010/0133911 A1* | 6/2010 | Williams | G05F 1/67 307/82 |
| 2010/0157632 A1* | 6/2010 | Batten | H02M 7/4807 363/74 |

OTHER PUBLICATIONS

Office Action for U.S. Appl. No. 13/169,767, mailed on May 27, 2014, David C. Buuck, "Wide Dynamic Range Charger", 13 pages.

* cited by examiner

*Primary Examiner* — Robert Grant
(74) *Attorney, Agent, or Firm* — Lee & Hayes, PLLC (57) ABSTRACT

A wide dynamic range charger module is configured to couple a variable power source such as a photovoltaic cell to a load. The module determines a maximum power point (MPPT) of the power source and based at least in part upon that MPPT selects one of a plurality of power converters to provide power to the load. The selection is such that the selected power converter is operating within its operating regime. The selected power converter may further be configured to a pre-determined input admittance which corresponds to the power source.

19 Claims, 6 Drawing Sheets

502 — eBook reader in suspend mode and having a power source comprising a photovoltaic (PV) cell is indoors and illuminated by room lights 504 — Wide Dynamic Range Charger Module determines a maximum power point (MPPT) associated with low illumination 506 — Couple the PV cell and a load via a low-range power converter; resulting energy transfer mitigates suspend mode power consumption 508 — eBook reader is moved outdoors and illuminated by sun 510 — Wide Dynamic Range Charger Module determines a maximum power point (MPPT) associated with high illumination 512 — Couple the PV cell and the load via a high-range power converter; resulting energy transfer consumed by suspend mode, battery charging, and so forth.

FIG. 6

WIDE DYNAMIC RANGE CHARGER

RELATED APPLICATION

This application is a continuation of, and claims priority to, U.S. patent application Ser. No. 13/169,767, filed on Jun. 27, 2011, the disclosure of which is incorporated by reference herein.

BACKGROUND

Electronic devices, such as electronic book readers ("eBook reader devices"), cellular telephones, portable media players, desktop computers, laptops, tablet computers, netbooks, personal digital assistants, and the like, rely on electrical power to function. Power sources provide electrical power to the electronic devices. Some power sources exhibit variable characteristics such as changing current and voltage output. For example, output voltage and current of a photovoltaic cell will vary as the level of light incident on the cell changes. These changing characteristics introduce difficulties in effectively transferring energy from the variable power source to a load within the electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices are commonplace in our world today, each consuming electrical power to operate. These devices may range from rechargeable lights illuminating a walkway to eBook readers, tablet computers, smartphones, and so forth. Components within these devices act as a load, storing or consuming electrical power. These components may include batteries, capacitors, microprocessors, computer memory, display devices, and so forth. The load has input characteristics, a particular range of voltage, current, and so forth for which the load is designed to operate.

A variety of power sources may provide electrical power to the load. Mechanical generators, photovoltaic cells, thermoelectric generators, and so on may generate a voltage differential and current flow suitable to supply the load.

Output characteristics of the power source such as voltage, current, and so forth may vary due during operation. For example, the voltage and current from a photovoltaic cell varies in proportion to a level of incident photon flux or illumination. Under a high photon flux, such as in full sun, the voltage and current produced by the photovoltaic cell may be substantially greater than that produced by the same cell under a low photon flux experienced indoors under artificial lighting.

Power transfer efficiency is a ratio of actual power transferred divided by the total power available. Matching the output characteristics of the power source to the input characteristics of the load improves the power transfer efficiency. Conversely, when the characteristics of the power source and the load are mismatched, power transfer efficiency is degraded. In situations where the power source provides a relatively small amount of power, such as in a photovoltaic cell under indoor lighting, such mismatch may result in dissipation of a substantial fraction of power from the photovoltaic cell before reaching the load, rendering the photovoltaic cell effectively useless. Furthermore, a mismatch may produce unintended adverse effects such as damage to circuitry, unreliable operation, and so forth to the power source, the load, or both.

Described in this disclosure are techniques and apparatus for dynamically coupling a power source having variable characteristics with a load. This coupling is configured to minimize or eliminate mismatches between the output characteristics of the power source and input characteristics of the load.

In one implementation, one of a plurality of power converters within a wide dynamic range charger module is selected to provide the coupling between the power source and the load. The power converters may be configured to transduce current to a voltage. The power converters may boost or buck voltage, current, and so forth. Each of the power converters is configured to operate in a different operating regime. An operating regime is a bounded region of particular characteristics such as voltage and current within which the power converter is designed to operate. For example, a low-range power converter is configured to maximize power transfer when the current from the power source is about 10 milliamps (mA) or less while a high-range power converter is configured to maximize power transfer when the current is greater than 10 mA.

The low- and high-range power converters may differ from one another by having components such as capacitors, inductors, and so forth with different operating values. Each power converter may be configured such that within that converter's particular operating regime of current, voltage, and so forth power transfer occurs with minimal overall loss. By selecting a power converter having an operating regime corresponding to the output characteristics of the power source at a given instant in time, efficiency of the converter as well as overall power transfer is improved compared to using a single power converter. Efficiency may be further improved by adjusting input admittance of the selected power converter to correspond to the power source.

Illustrative eBook Reader Device

Figure 1:
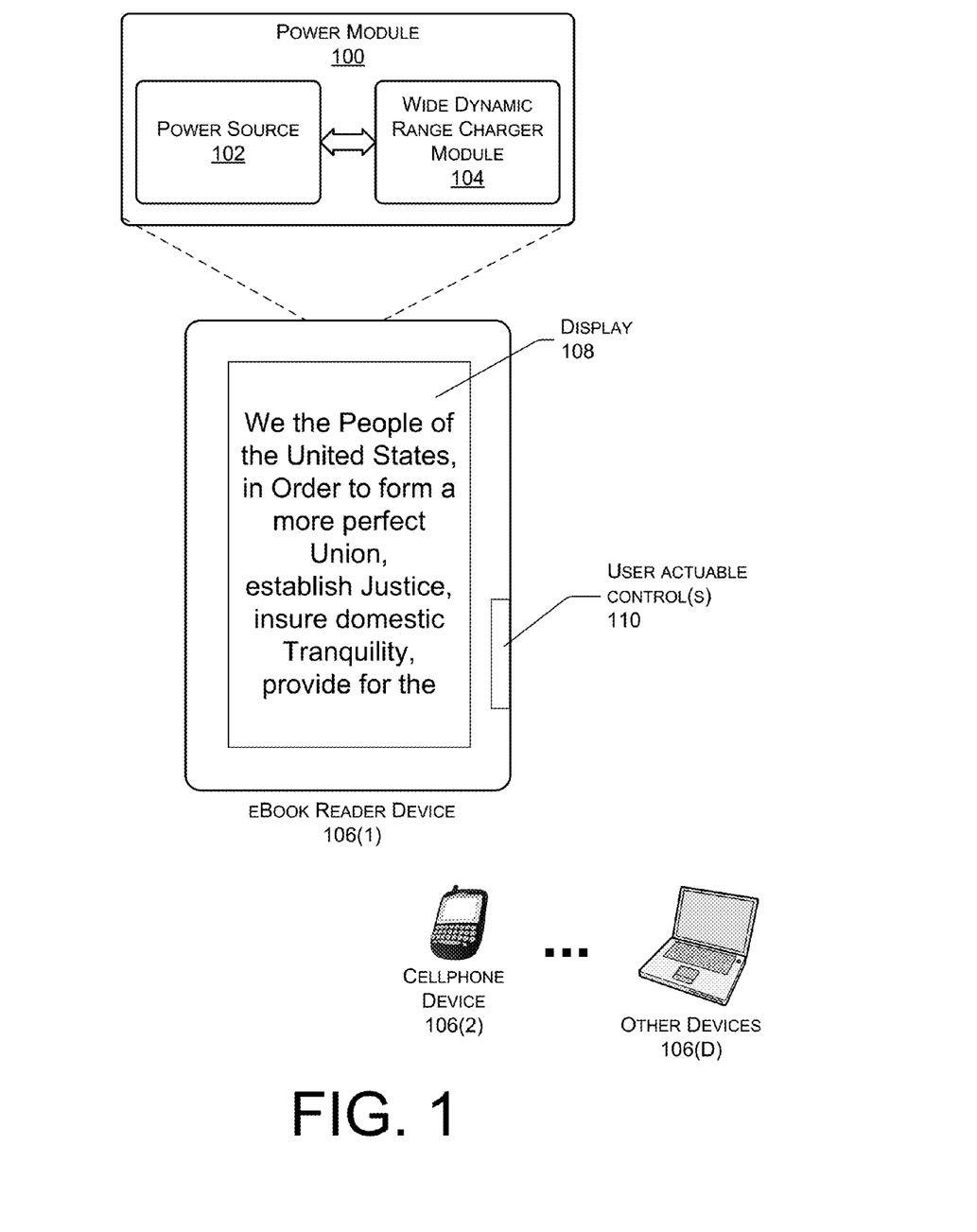
FIG. 1 is an illustrative electronic device (here, an eBook reader device) configured with a wide dynamic range charger module configured to transfer power from a variable power source to a load.

FIG. 1 depicts an illustrative power module 100 having a power source 102 and a wide dynamic range charger module 104. Analog, digital, or mixed circuitry may be configured to implement the wide dynamic range module 104 described herein. Briefly, the power source 102 outputs electrical energy, which couples to a load by the wide dynamic range charger module 104. The wide dynamic range charger module 104 is configured to select a power converter from a plurality of power converters, each having a different operating regime. This selection may be made at least in part based upon a maximum power point (MPPT) of the power source at a given instant in time.

The wide dynamic range charger module 104 dynamically changes which power converter is selected in response to changes in the output characteristics of the power source 102. For example, consider when the power source 102 is a photovoltaic cell. The output characteristics such as voltage and current of the photovoltaic cell may vary proportionately with incident photon flux. When indoors under artificial light, the photon flux is relatively low resulting in a correspondingly low MPPT. In comparison, when outdoors in bright sun the photon flux is relatively high and a correspondingly high MPPT is presented. The wide dynamic range charger module 104 is configured to select the power converter with the operating regime most closely matching the output characteristics. By selecting the power converter having an operating regime complementary to the MPPT of the power source 102 at a given moment in time, power transfer is improved compared to using a single power converter across a wide range.

The power module 100 may be utilized by electronic devices 106 including cellular phones, portable media players, tablet computers, netbooks, laptops, personal computers, cash registers, electronic book ("eBook") readers, servers, medical devices, data acquisition devices, and so forth. Because of this wide applicability, several devices are shown in this illustration that may utilize the wide dynamic range charger module 104. For example, the electronic device 106 may comprise an electronic book (eBook) reader device 106(1), which is shown embodied as a handheld, dedicated eBook reader device in the illustrated example. FIG. 1 also illustrates that a cellphone device 106(2) and other devices 106(D), such as a netbook computer, may include and implement the power module 100 with the wide dynamic range charger module 104. As used herein, letters within parenthesis such as "(D)" indicate an integer greater than zero.

The eBook reader device 106(1) may have a display 108 to present content in a human-readable format to a user. The display 108 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 108 is shown in a generally rectangular configuration. However, it is understood that the display 108 may be implemented in any shape, and may have any ratio of height to width. Also, for stylistic or design purposes, the display 108 may be curved or otherwise non-linearly shaped. Furthermore the display 108 may be flexible and configured to fold or roll.

The content presented on the display 108 may take the form of electronic books or "eBooks." For example, the display 108 may depict the text of the eBooks and also any illustrations, tables, or graphic elements that might be contained in the eBooks. The terms "book" and "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 106 may include a touch sensor for user input. For example, the display 108 of the eBook reader device 106(1) may be coupled to or incorporate a touch sensor, resulting in a touch screen that accepts user input through contact or gesturing relative to the display.

The eBook reader device 106(1) may also incorporate one or more user actuable controls 110 such as buttons for user input. The one or more user actuable controls may have dedicated or assigned operations. For instance, the user actuable controls 110 may include page turning buttons, a joystick, navigational keys, a power on/off button, selection keys, and so on.

While one embodiment of an electronic device 106 is shown in relation to the eBook reader device 106(1), it is understood that electronic devices include cellular telephones 106(2), and other devices 106(D) such as portable media players, tablet computers, netbooks, laptops, personal computers, cash registers, servers, medical devices, data acquisition devices, and the like.

Figure 2:
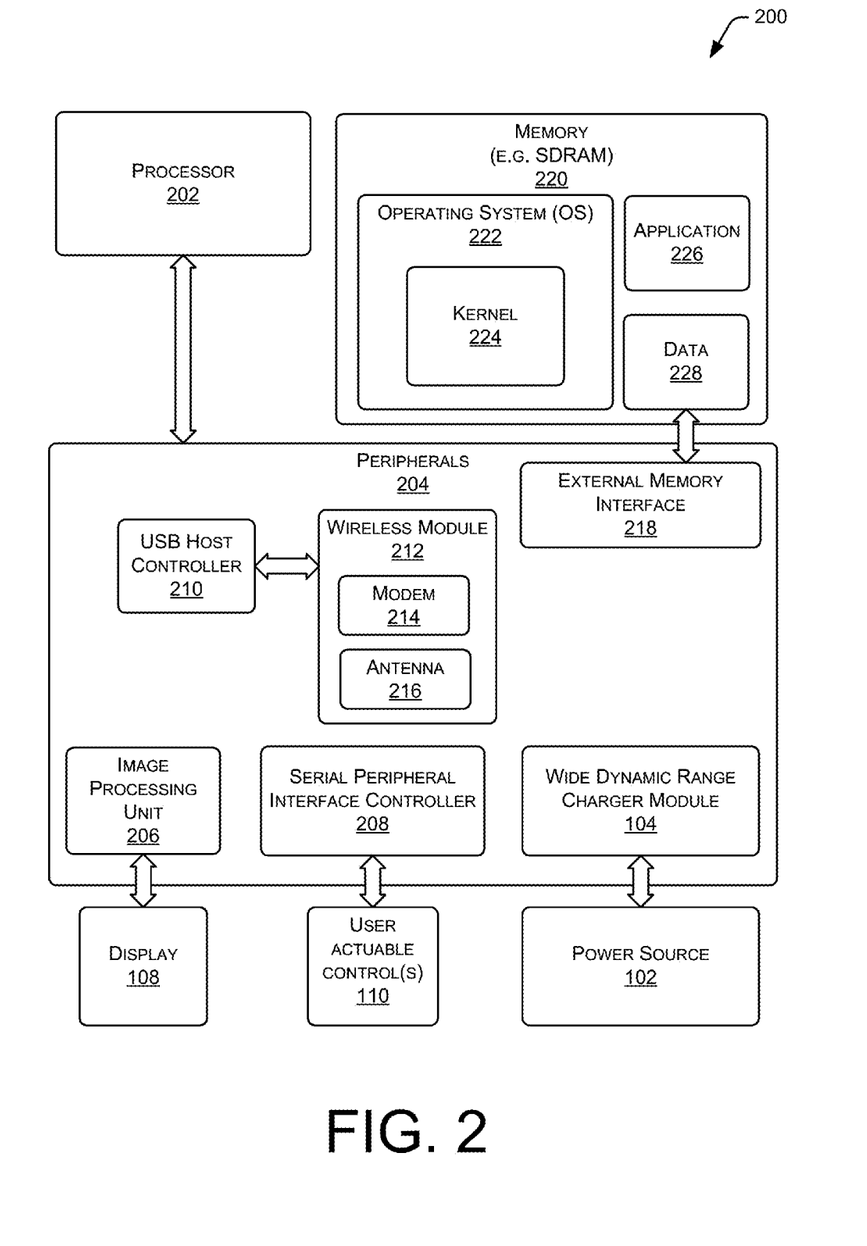
FIG. 2 is an illustrative schematic of the electronic device configured to use the wide dynamic range charger module of FIG. 1.

FIG. 2 is a block diagram 200 of the illustrative electronic device 106 showing the internal components. In a very basic configuration, the device 106 includes or accesses components such as a processor 202 and one or more peripherals 204. Each processor 202 may itself comprise one or more processors.

The peripherals 204 couple to the processor 202. The processor and associated architecture may include the i.MX architecture from Freescale™ Semiconductor Incorporated of Austin, Tex., the x86 architecture from Intel Corporation of Santa Clara, Calif., the Open Multimedia Application Platform (OMAP) from Texas Instruments Inc.™ of Dallas, Tex., and so forth.

An image processing unit 206 is shown coupled to one or more displays 108. The display 108 presents content in a human-readable format to a user. In some implementations, multiple displays may be present and coupled to the image processing unit 206. These multiple displays may be located in the same or different enclosures or panels. When multiple displays are present, these displays may be of the same or different types. For example, one display may be an electrophoretic display while another may be interferometric. Furthermore, one or more image processing units 206 may couple to the multiple displays.

FIG. 2 further illustrates that the electronic device 106 includes a serial peripheral interface ("SPI") controller 208 and associated SPI bus. Various peripherals may couple to the processor 202 via SPI or other interfaces. For example, the one or more user actuable controls 108 may couple to the processor 202 via the SPI controller 208. These user actuable controls 108 may have dedicated or assigned operations, and may include page turning buttons, a joystick, navigational keys, touch sensor, a power on/off button, selection keys, and so on.

The peripherals 204 may include a USB host controller 210. The USB host controller 210 manages communications between components attached to a universal serial bus ("USB") and the processor 202 and other peripherals.

The USB host controller 210 may also couple to a wireless module 212 via the universal serial bus. The wireless module 212 may allow for connection to wireless local or wireless wide area networks ("WWAN"). The wireless module 212 may include a modem 214 configured to send and receive data wirelessly and one or more antennas 216 suitable for propagating a wireless signal. In some implementations, a wired network interface may be provided.

The electronic device 106 may also include an external memory interface ("EMI") 218 coupled to external memory 220. The EMI 218 manages access to data stored in the external memory 220. The external memory 220 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 220 may store an operating system 222 comprising a kernel 224. In some implementations the kernel 224 may operatively couple to the wide dynamic range charger module 104. The external memory 220 may also store executable applications 226 as well as data 228, which may comprise content objects for consumption on the electronic device 106, databases, user settings, configuration files, device status, and so forth.

The electronic device 106 may include one or more other, non-illustrated peripherals, such as a hard drive using magnetic, optical, or solid state storage to store information, an Institute of Electrical and Electronics Engineers (IEEE) 1394 serial bus interface, a Bluetooth™ wireless network interface, camera, global positioning system, PC Card component, and so forth.

The power source 102 may couple to the wide dynamic range charger module 104 as illustrated. The power source 102 is discussed in more detail below with regards to FIG. 3. In some implementations the wide dynamic range charger module 104 may couple to the processor 202, such as via the SPI bus, or may operate independently.

Couplings, such as that between the wide dynamic range charger module 104 and the power source 102, are shown for emphasis. There are couplings between many of the components illustrated in FIG. 2, but graphical arrows are omitted for clarity of illustration.

Illustrative Power Source and Wide Dynamic Range Charger Module

Figure 3:
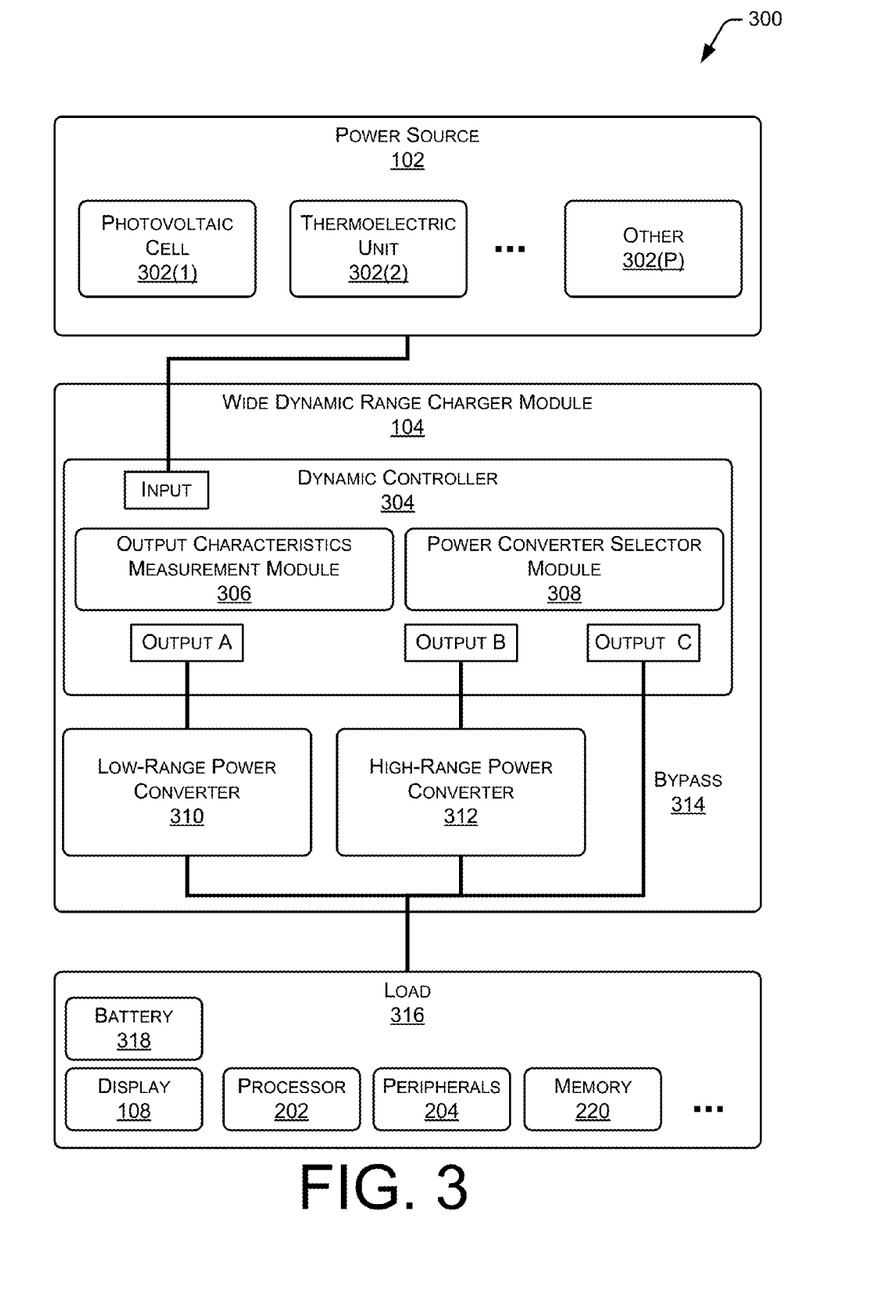
FIG. 3 is an illustrative schematic of the wide dynamic range charger module having a low-range power converter and a high-range power converter.

FIG. 3 is an illustrative schematic 300 of the power source 102, the wide dynamic range charger module 304, and a load 316. The power source 102 is configured to generate an electrical current from an ambient energy supply. For example, the power source 102 may include one or more photovoltaic cells 302(1) arranged into a photovoltaic module and configured to convert incident photons into electrical power. Additionally or alternatively, a thermoelectric unit 302(2) may exploit a temperature differential to generate electrical power. Other power sources 302(P) may include vibration-powered generators, magnetohydrodynamic generators, betavoltaic generators, and so forth.

The power source 102 may provide operational electrical power or less than operational electrical power. Operational electrical power is sufficient to provide for operation of the device 106, as distinguished from the lesser electrical power requirements of a low power mode such as an idle, deep idle, doze, quiescent, or suspend mode.

The power source 102 may be integrated into the device 106, or may be provided as an add-on. For example, the photovoltaic cell 302(1) may be built into a portion of a bezel of the device 106 or may be part of a separate cover which mechanically and electrically couples to the device 106.

The power source 102 is coupled to the wide dynamic range charger module 104, such as by an electrical conductor, inductive linkage, and so forth. The wide dynamic range charger module 104 includes a dynamic controller module 304. The dynamic controller module 304 is configured to accept power from the power source 102 at an input and selectively couple that input to one or more outputs. In some implementations, there may be a plurality of inputs with each input coupled to a different power source 102 and configured to be independently addressed.

The dynamic controller module 304 may comprise an output characteristics measurements module 306. The output characteristics measurements module 306 is configured to measure one or more output characteristics of the power source 102, such as voltage, current, resistance, and so forth.

A power converter selector module 308 is configured to accept the measurements of the output characteristics from the output characteristics measurement module 306. Based at least in part upon these measurements, the power converter selector module 308 selects an output with an associated power converter to couple the power source 102 to. The power converter selector module 308 may also be configured to configure the selected power converter to a pre-determined input admittance. This pre-determined input admittance may be set such that power transfer is maximized. In another implementation, the power converters may be configured to determine and configure the input admittance.

Each output connects to one of a plurality of power converters, a bypass, or other power conditioning circuitry. At least one of the power converters is configured to have a specific operating regime that differs from other power converters. For example output A of the dynamic controller 304 as shown here couples to a low-range power converter 310. The low-range power converter 310 may be configured with an operating regime suited to handle currents up to about 10 mA. In contrast, output B couples to a high-range power converter 312 configured with an operating regime suited to handle currents in excess of 10 mA. In some implementations a bypass 314 may be provided to permit direct coupling of the power source 102 to a load 316. While two power converters are shown, other embodiments may have more. As mentioned above, the power converters may act to transduce current to voltage.

By selecting a power converter which most closely corresponds to the output characteristics of the power source 102, power transfer to the load 316 is improved across a wide range of output characteristics. For example, when the photovoltaic cell 302(1) is indoors and generating 5 mA of current, the low-range power converter 310 may be used to transfer power to the load 316. Input admittance data may also be provided to and used by the low-range power converter 310 to configure the input admittance of the low-range power converter 310. In contrast, when the photovoltaic cell 302(1) is outdoors under full illumination and generating 15 mA of current, the high-range power converter 312 transfers power to the load 316. Similarly, the input admittance of the high-range power converter 312 may also be configured to improve power transfer.

The load 316 is configured to consume or store electrical power provided by the power source 102. The load 316 may include a battery 318 accepting a charge, the display 108, the processor 202, the peripherals 204, the memory 220, and so forth.

The battery 318 includes components capable of storing and later releasing electrical power to an electronic device. When storing power, the battery 318 acts as a load. When releasing power, the battery 318 may act as a power source 102. Batteries include chemical storage cells such as lithium polymer batteries, charge storage devices such as ultracapacitors, regenerative fuel cell, and so forth.

In some implementations the battery 318 may act simultaneously as a load and as a power source. For example, the processor 202 may draw power from the battery 318 while the battery 318 is itself accepting a charge from the photovoltaic cell 302(1). The power from the photovoltaic cell 302(1) serves to offset at least in part the drain of the processor 202. Such an offset serves to extend the available battery life by reducing power consumed from the battery.

In some implementations the wide dynamic range charger module 104 may selectively couple its overall output to a particular load. For example, the photovoltaic cell 302(1) may be coupled to only the battery 318.

Figure 4:
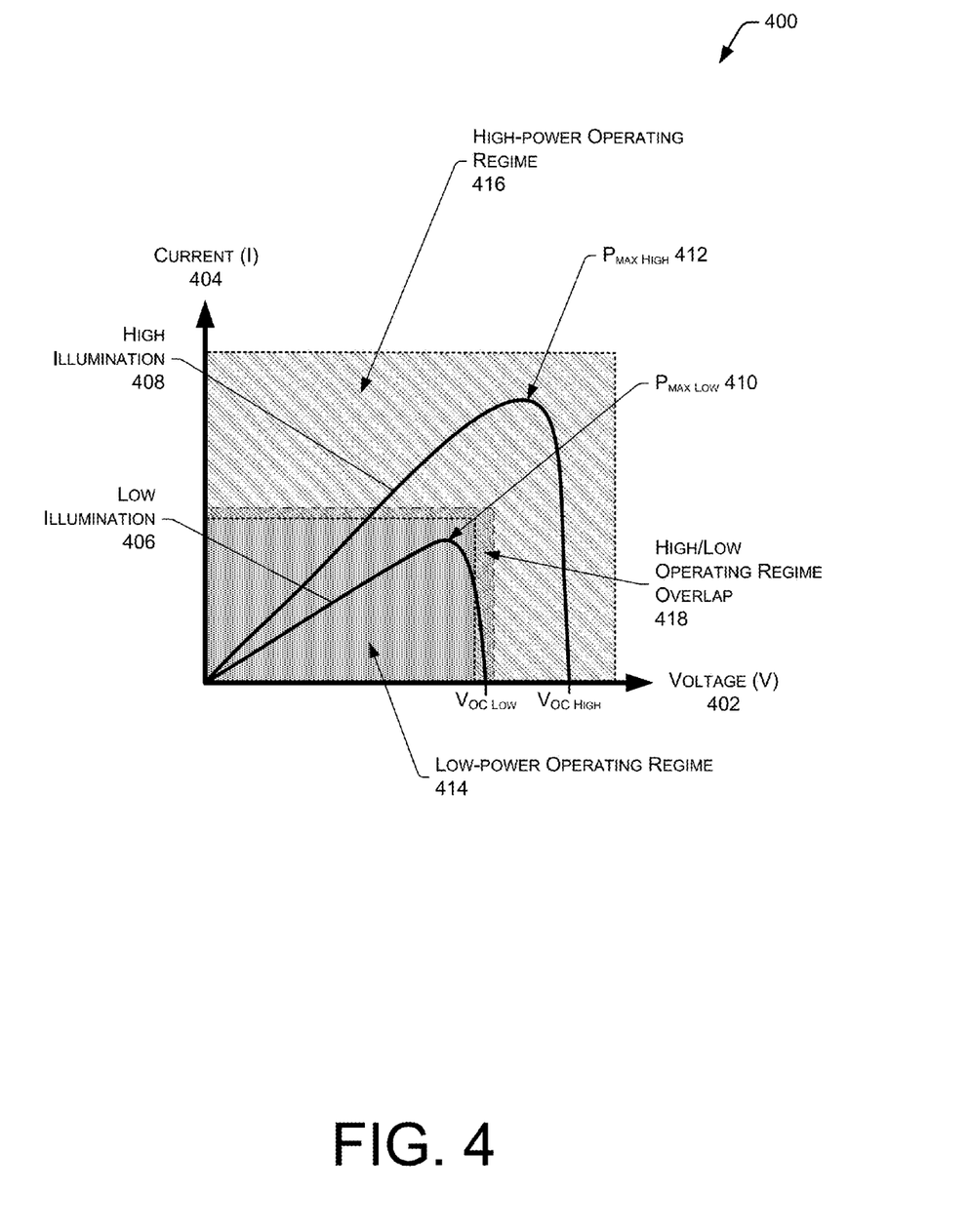
FIG. 4 is a graph illustrating voltage-current curves for a photovoltaic power source at high and low illumination states, as well as operating regimes boundaries for the low-range power converter and the high-range power converter within the wide dynamic range charger module.

FIG. 4 is a graph 400 illustrating voltage-current curves for a photovoltaic cell 302(1) power source 102. In this graph, voltage "V" 402 increases along the horizontal axis while current "I" 404 increases along a vertical axis.

Plotted on this graph are curves corresponding to the photovoltaic cell 302(1) at low illumination 406 and at high illumination 408. These curves extend from the origin to their open-circuit voltage $V_{OC}$. Maximum power points (MPPT) for each curve are also depicted as $P_{MAX}$. A $P_{MAX\ LOW}$ is shown at 410, indicating the maximum power point for the low illumination 406 curve. A $P_{MAX\ HIGH}$ is shown at 412, indicating the maximum power point for the high illumination 408 curve. The MPPT may be determined as a local maximum on the voltage-current curve.

The MPPT may be estimated as a product of a factor of between about 0.70 and 0.80 and an open circuit voltage of the photovoltaic module. In some implementations a factor of about 0.76 yields a suitably close approximation to the MPPT. For example, where the open-circuit voltage $V_{OC}$=1.5 the MPPT would be at about 1.5×0.76=1.14

The MPPT may also be considered the condition when a characteristic resistance of the power source 102 is approximately equal to that of a load resistance. When operated at the MPPT, the power source 102 is delivering its maximum available power to the load 316.

Also depicted are the operating regimes for the low-range power converter 310 and the high-range power converter 312. An operating regime for a power converter is a bounded region of voltage and current within which the power converter is configured to operate. While the power converter may be operated outside of its operating regime, such operation may result in undesirably low efficiencies, instability, or other adverse effects.

A low-power operating regime 414 is depicted. As shown here, this operating regime extends from the origin to slightly beyond the low illumination 406 curve. The boundary of the low-power operating regime 414 is indicated with a dashed line. The $P_{MAX\ LOW}$ 410 here is shown within the low-power operating regime 414. Generally speaking, the wide dynamic range charger module 104 will select the power converter having an operating regime which contains the MPPT.

A high-power operating regime 416 is also shown, extending from about the low illumination 406 curve outwards. The boundary of this regime is indicated with a dotted line. Within the high-power operating regime the $P_{MAX}$ HIGH 412 is shown. In some implementations, the operating regimes of two or more of the power converters may overlap such as shown at 418. The power converter selector module 308 may be configured with a memory or hysteresis with regard to selection and transition between power converters. Such a configuration prevents the power converter selector module 308 from oscillating between outputs and potentially entering a metastable state.

Illustrative Processes

The processes described herein may be implemented by the architecture described above, or by other architectures. These processes are illustrated in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
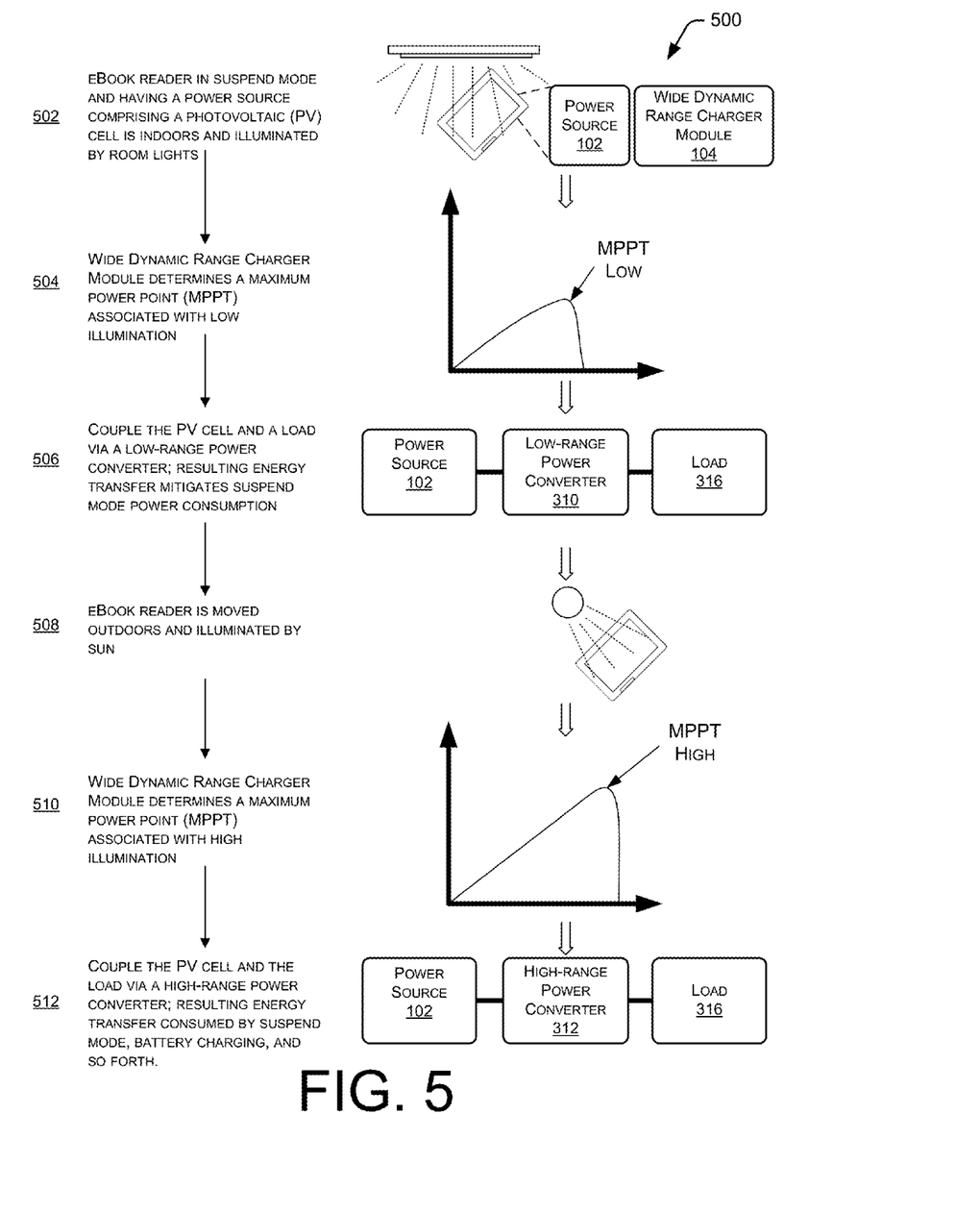
FIG. 5 is an illustrative process of the wide dynamic range module transitioning from the low-range power converter to the high-range power converter in response to changing output of the power source.

FIG. 5 is an illustrative process 500 of the wide dynamic range module transitioning from a low-range power converter to a high-range power converter in response to changing output of the power source. At 502, the eBook reader device 106(1) is located indoors under artificial lighting and is in a suspend mode in which it consumes less power than when actively operating. The power source 102 comprises the photovoltaic cell 302(1) coupled to the wide dynamic range charger module 104.

At 504, the wide dynamic range charger module 104 determines a maximum power point (MPPT) associated with the photovoltaic cell 302(1) operating in the low illumination provided by the artificial lighting. At 506, the photovoltaic cell 302(1) is coupled to the load such as the battery 318 via the low-range power converter 310, which the module 104 selected with reference to the determined MPPT. The power produced by the photovoltaic cell 302(1) may not be sufficient to charge the battery 318, but does serve to offset at least a portion of the power consumed by the device 106(1) while in suspend mode. This offset extends the effective battery life 318 of the device while in the lower power modes such as suspend, doze, quiescent, and so forth.

At 508, the eBook reader device 106(1) is moved outdoors and is now illuminated by direct sunlight. As a result, the output characteristics of the photovoltaic cell 302(1) have changed, such as an increase in voltage and current.

At 510, the wide dynamic range charger module 104 has detected the change in output characteristics of the photovoltaic cell 302(1) and determines a new MPPT. This new MPPT corresponds to the newly changed condition of the photovoltaic cell 302(1) being in direct sunlight.

At 512, at least partly in response to this determination, the wide dynamic range charger module 104 couples the photovoltaic cell 302(1) to the load 316 via the high-range power converter 312. The resulting energy as transferred may be consumed by the device in suspend mode, to charge the battery 318, operate the device in an active mode, and so forth.

Figure 6:
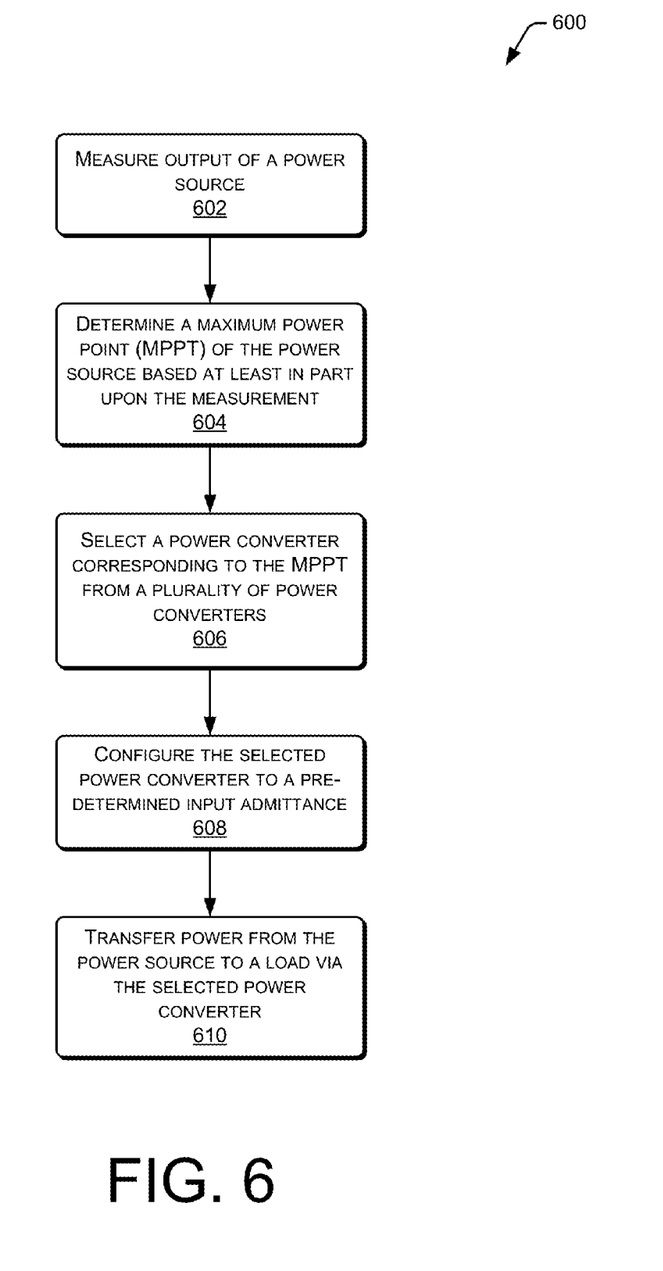
FIG. 6 is an illustrative process of selecting a power converter based at least in part upon a maximum power point of the power source.

FIG. 6 is an illustrative process 600 of selecting a power converter. At 602, the output of a power source 102 is measured. This measurement may include determining the output characteristics of the power source such as detection of the voltage of the power source 102, sensing current flow from the power source 102, or a combination thereof. As described above, the output characteristics measurement module 306 may perform this measurement.

At 604, a maximum power point (MPPT) is determined based at least in part upon the measurement of the power source 102. In some implementations the MPPT determination may also be based at least in part on the input characteristics of the load 316. The power converter selector module 308 may be configured to determine the MPPT.

At 606, a power converter is selected from a plurality of power converters based at least in part on the determined MPPT. Each of the plurality of power converters may have different operating regimes. As mentioned above, the operating regimes may overlap in some implementations. In this situation, a memory or hysteresis function may be used to preferentially select one operating regime over another and avoid the wide dynamic range charger module 104 from entering an undesirable metastable state. As described above, the power converter selector module 308 is configured to perform the selection.

At 608, the selected power converter is configured to a pre-determined input admittance. As described above, in one implementation the power converter may determine and configure the input admittance. In another implementation the power converter may receive data or a signal indicating the input admittance to be configured for. For example, the power converter selector module 308 may provide this data via an analog or digital signal to the selected power converter. The pre-determined input admittance may be such that power transfer between the power source 102 and the power converter is maximized.

At 610, power is transferred from the power source 102 to the load 316 via the selected power converter. Because the operating regime of the selected power converter corresponds to the MPPT of the power source 102 at a given instant in time, power transfer to the load is maximized.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device, comprising:
   a first power converter having a first fixed operating regime;
   a second power converter separate from the first power converter, the second power converter having a second fixed operating regime that is different from and overlapping with the first fixed operating regime, the first and second power converters being configured to transduce current received from a power source having a maximum power point; and
   a power converter selection module coupled to the first and second power converters, the power converter selection module being configured to select one of the first power converter or the second power converter based on the maximum power point and a hysteresis function governing selection of power converters having overlapping operating regimes.

2. The device of claim 1, wherein the power converter selection module is further configured to configure the one of the first power converter or the second power converter to a predetermined input admittance.

3. The device of claim 1, further comprising a bypass circuit, wherein selection of the bypass circuit by the power converter selection module couples the power source to a load, and bypasses the first and second power converters.

4. The device of claim 1, wherein the first fixed operating regime comprises a first bounded region of voltage and current within which the first power converter is configured to operate with a first power loss, and wherein the first power loss is less than a second power loss associated with operation of the first power converter outside of the first bounded region.

5. The device of claim 1, further including a linkage configured to couple to the power source, an input configured to receive power from the power source via the linkage, and an output configured to direct power received from the power source to a load via the one of the first power converter or the second power converter, wherein:
   the power converter selection module is coupled to the output and is configured to direct power received from the power source to the one of the first power converter or the second power converter via the outlet.

6. The device of claim 1, further comprising:
   an output characteristics module configured to determine at least one output characteristic of the power source, and
   a plurality of outputs, the power converter selection module being configured to receive information from the output characteristics module indicative of the at least one output characteristic, and to select one of the plurality of outputs based at least in part on the information.

7. The device of claim 1, wherein the first operating regime is characterized by a first maximum input current of approximately 10 mA, and the second operating regime is characterized by a second maximum input current greater than the first maximum input current.

8. The device of claim 1, further comprising a first output coupled to the first power converter and a second output coupled to the second power converter, wherein:
   selection of the one of the first power converter or the second power converter includes selecting a corresponding one of the first output or the second output, and
   the memory or hysteresis function prevents the power converter selection module from selecting the other of the first output or the second output after selection of the one of the first power converter or the second power converter.

9. A device, comprising:
   a first power converter having a first fixed operating regime;
   a second power converter separate from the first power converter, the second power converter having a second fixed operating regime that is different from the first fixed operating regime, the first and second power converters being configured to transduce current received from a power source having a maximum power point; and a power converter selection module configured to select one of the first power converter or the second power converter based on an input characteristic of a load coupled to the one of the first power converter or the second power converter, the maximum power point, the first operating regime, and the second operating regime, wherein the maximum power point is determined based at least in part on the input characteristic of the load.

10. The device of claim 9, further comprising a bypass circuit and an output, wherein selection of the bypass circuit by the power converter selection module couples the power source to the load via the output, and bypasses the first and second power converters.

11. The device of claim 9, further including an input and an output, wherein:

the input is coupled to the power converter selection module and configured to receive power from the power source, and the output is configured to direct power received from the power source, via the input, to the load via the one of the first power converter or the second power converter.

12. The device of claim 9, wherein the maximum power point comprises a point at which a resistance of the power source is approximately equal to a resistance of the load.

13. The device of claim 9, further comprising:

an output characteristics module configured to determine at least one output characteristic of the power source, and a plurality of outputs, the power converter selection module being configured to receive information from the output characteristics module indicative of the at least one output characteristic, and to select one of the plurality of outputs based at least in part on the information.

14. The device of claim 9, wherein the maximum power point is determined based at least in part on a measured change in power output of the power source.

15. A method, comprising:

determining a maximum power point of a power source; and selecting one of a first power converter or a second power converter separate from the first power converter to transduce current received from the power source, the first power converter having a first fixed operating regime and the second power converter having a second fixed operating regime different from the first operating regime, wherein the one of the first power converter or the second power converter is selected based at least in part on an input characteristic of a load coupled to the one of the first power converter or the second power converter, the maximum power point, the first operating regime, and the second operating regime, and wherein the maximum power point of the power source is determined based at least in part on the input characteristic of the load.

16. The method of claim 15, further comprising determining an output voltage of the power source, and determining the maximum power point of the power source based at least in part on the output voltage.

17. The method of claim 15, wherein at the maximum power point of the power source, a resistance of the power source is approximately equal to a resistance of the load.

18. The method of claim 15, further comprising determining an output characteristic of the power source, and selecting one of a first output or a second output based at least in part on the output characteristic, wherein the first output is coupled to the first power converter and the second output is coupled to the second power converter.

19. The method of claim 18, further comprising preventing selection of the other of the first output or the second output after selection of the one of the first power converter or the second power converter.

* * * * *